UNITED STATES PATENT OFFICE.

OTTO WOLFES, OF DARMSTADT, GERMANY.

PROCESS OF MANUFACTURING BARBITURIC ACID.

No. 894,994.     Specification of Letters Patent.     Patented Aug. 4, 1908.

Application filed September 22, 1905. Serial No. 279,689.

*To all whom it may concern:*

Be it known that I, OTTO WOLFES, doctor of philosophy, a subject of the German Emperor, residing at the city of Darmstadt, in the Empire of Germany, have invented certain new and useful Improvements in the Process of Manufacturing Barbituric Acids, of which the following is a specification.

I have ascertained that if guanyl-urea is condensed with cyan derivatives of the following general formula

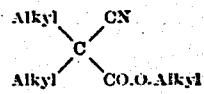

condensation products are obtained which are probably mixtures of several substances for the reason that guanyl-urea is enabled to react in two pseudomeric forms:

(a) $NH_2-CO-NH-C{<}^{NH}_{NH_2}$

This unsymmetrical form can be condensed with the above mentioned derivatives to substances of the two following typical formulæ:

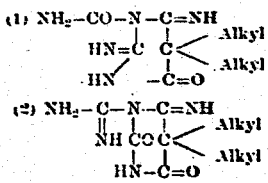

The second symmetrical form:

(b) $NH_2-CO-N=C{<}^{NH_2}_{NH_2}$ is under the same circumstances condensed to substances of the following typical formula:

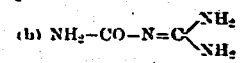

The substances of all these three typical formulæ, when heated with aqueous acids, are easily converted into dialkyl barbituric acids of the well known formula:

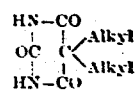

the reactions taking probably place in accordance with the following formulæ:

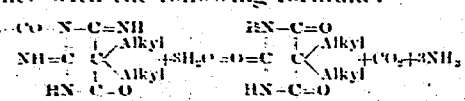

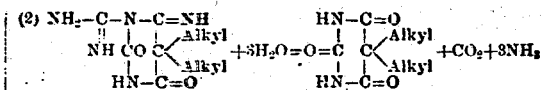

The essential characteristics of the process thus indicated will be seen from what is common to the following specific example:

*Example, guanyl-urea and diethylcyanaceticester.*—13.8 kg. (one molecular proportion) of dried pulverized guanyl-urea hydrochlorid are stirred for 7 hours at a temperature of 100 degrees C. together with 17 kg. (one molecular proportion) of diethylcyanacetic ester and a solution of 6.9 kg. (three atomic proportion) of sodium in 150 liters of absolute alcohol. The filtrate from the separated sodium chlorid is freed from alcohol, put into water and neutralized with acetic acid. The precipitate is obtained by centrifugal force and washed in water. This raw product, comprising several compounds without being divided into its constituents, is directly heated with sulfuric acid of 50%. It is changed into the known diethyl barbituric acid which is then purified in the usual known way.

Having now described my invention and in what manner the same is to be performed, what I claim as new and desire to secure by Letters Patent, is:

1. The process of manufacturing dialkyl barbituric acids consisting in condensing guanyl-urea with cyan derivatives of the following general formula:

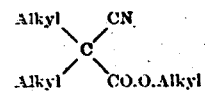

by heating the mixture of the said substances and saponifying the resulting condensation products by treating these products with acids, substantially as described.

2. The process of manufacturing dialkyl barbituric acids consisting in condensing guanyl-urea with dialkyl cyanacetic esters of the following general formula:

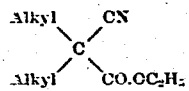

by heating the mixture of the said substances and saponifying the resulting condensation products by treating these products with acids, substantially as described.

3. The process of manufacturing diethyl barbituric acid consisting in condensing guanyl-urea with diethyl cyanacetic ester of the formula:-

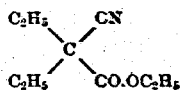

by heating the mixture of the said substances and saponifying the resulting condensation product by treating this product with an acid, substantially as described.

In testimony whereof I have signed my name to this specification in the presence of two subscribing witnesses.

OTTO WOLFES.

Witnesses:
  WALTER SCHUMANN,
  K. SEEL.